United States Patent
Staples (10) Patent No.: US 10,974,781 B2
(45) Date of Patent: Apr. 13, 2021

(54) BICYCLE SEAT POST TRAVEL ADJUSTMENT ASSEMBLY

(71) Applicant: D3 Innovation Inc., Squamish (CA)

(72) Inventor: Jonathan Staples, Garibaldi Highlands (CA)

(73) Assignee: D3 Innovation Inc.

( * ) Notice: Subject to any disclaimer, the term of this patent is extended or adjusted under 35 U.S.C. 154(b) by 0 days.

(21) Appl. No.: 16/378,715

(22) Filed: Apr. 9, 2019

(65) Prior Publication Data

US 2019/0308681 A1    Oct. 10, 2019

Related U.S. Application Data

(60) Provisional application No. 62/655,561, filed on Apr. 10, 2018.

(51) Int. Cl.
B62J 1/08 (2006.01)

(52) U.S. Cl.
CPC ............ B62J 1/08 (2013.01); *B62J 2001/085* (2013.01)

(58) Field of Classification Search
CPC ..... B62K 19/36; B62J 1/06; B62J 1/08; B62J 1/10; B62J 2001/085; A47C 3/30; Y10T 403/32516; Y10T 403/32483
See application file for complete search history.

(56) References Cited

U.S. PATENT DOCUMENTS

| | | | |
|---|---|---|---|
| 4,354,398 A | * | 10/1982 | Porter .................... B60N 2/231 403/155 |
| 4,421,357 A | | 12/1983 | Shimano |
| 4,807,856 A | * | 2/1989 | Teckenbrock ......... B62K 19/36 188/67 |
| 4,995,753 A | | 2/1991 | Shook |
| 5,226,624 A | | 7/1993 | Kingsbery |
| 5,244,301 A | | 9/1993 | Kurke et al. |

(Continued)

FOREIGN PATENT DOCUMENTS

| | | |
|---|---|---|
| EP | 3196107 | 7/2017 |
| FR | 2409182 | 6/1980 |

(Continued)

OTHER PUBLICATIONS

Mad Suspension Manic Drop Post, information found onine at https://www.xfusionshox.com/products_detail/44.htm 2020.

(Continued)

*Primary Examiner* — Daniel J Wiley
(74) *Attorney, Agent, or Firm* — Kevin Shipley; Fogler, Rubinoff LLP (57) ABSTRACT

There is described a bicycle seat post assembly in which the travel distance of the seat post can be adjusted. The seat post assembly includes an outer tube that is configured to telescopically receive an inner tube. The inner tube is axially slidable relative to the outer tube between a retracted position and an extension position, the extension position being determined by an extension assembly in which a slider engages an upper retainer surface, thereby setting the upper limit of axial extension of the inner tube. The extension of the inner tube can be limited to an intermediary extension position that lies between the retracted and extension positions by an insertable extension stopper that is positionable under the upper retainer surface.

16 Claims, 11 Drawing Sheets

(56) References Cited

U.S. PATENT DOCUMENTS

| | | | |
|---|---|---|---|
| 5,466,042 A | 11/1995 | Herman | |
| 5,649,738 A | 7/1997 | Thomson | |
| 5,664,829 A | 9/1997 | Thomson | |
| 5,722,718 A | 3/1998 | Still et al. | |
| 5,909,890 A * | 6/1999 | Sachs | B62K 25/286 188/300 |
| 5,979,978 A | 11/1999 | Olsen et al. | |
| 6,220,582 B1 * | 4/2001 | Wandschneider | B62J 1/06 267/64.12 |
| 7,059,592 B2 * | 6/2006 | Huh | A47C 3/30 188/300 |
| 7,231,866 B2 * | 6/2007 | Seong | A47C 3/30 297/344.19 |
| 8,079,772 B1 | 12/2011 | Brennan | |
| 8,167,373 B2 * | 5/2012 | Allison | A47C 3/30 297/344.19 |
| 8,177,251 B2 * | 5/2012 | Shirai | B62J 1/08 280/288.4 |
| 8,191,964 B2 * | 6/2012 | Hsu | B62K 19/36 280/288.4 |
| 8,308,124 B2 * | 11/2012 | Hsu | B62J 1/08 248/161 |
| 8,814,109 B2 | 8/2014 | Laird et al. | |
| 8,926,216 B2 * | 1/2015 | McAndrews | B62K 19/18 403/109.7 |
| 9,688,331 B1 | 6/2017 | Shirai | |
| 10,549,803 B2 | 2/2020 | Shipman et al. | |
| 2002/0185581 A1 * | 12/2002 | Trask | F16B 7/105 248/408 |
| 2005/0067863 A1 | 3/2005 | Roizen | |
| 2006/0152045 A1 | 7/2006 | Okajima et al. | |
| 2007/0046081 A1 | 3/2007 | Shook | |
| 2007/0063554 A1 | 3/2007 | Liao | |
| 2007/0286671 A1 | 12/2007 | Meggiolan | |
| 2009/0066124 A1 | 3/2009 | Pirovano | |
| 2010/0052377 A1 | 3/2010 | Hsu et al. | |
| 2011/0291446 A1 | 12/2011 | Bourgeois | |
| 2012/0181824 A1 | 7/2012 | Hsu et al. | |
| 2013/0269655 A1 * | 10/2013 | Yamazaki | F02D 11/04 123/403 |
| 2014/0239682 A1 | 8/2014 | Tisue | |
| 2015/0145294 A1 | 5/2015 | Kench, III | |
| 2015/0232158 A1 | 8/2015 | Bouse | |
| 2017/0166275 A1 | 6/2017 | McPherson et al. | |
| 2017/0225731 A1 | 8/2017 | Hsu | |
| 2018/0015976 A1 | 1/2018 | Hermansen et al. | |
| 2019/0283827 A1 | 9/2019 | Shipman et al. | |
| 2019/0300088 A1 | 10/2019 | Jordan | |
| 2019/0301497 A1 | 10/2019 | Jordan | |

FOREIGN PATENT DOCUMENTS

| | | |
|---|---|---|
| TW | 201801969 | 1/2018 |
| TW | M575784 | 3/2019 |

OTHER PUBLICATIONS

Fox Transfer Hydraulic Infinite Adjust Seat Post, information found online at https://www.ridefox.com/family.php?m=bike&family=seatpost 2020.

KS Suspension LEV Intergra dropper post, information found online at https://www.kssuspension.com/product/lev-integra/ 2020.

9point8 The Fall Line dropper post, information found online at https://www.9point8.ca/index.php?route=product/product&path=42&product_id=213 2020.

Contact SL Switch Seatpost. Online at <https://www.giant-bicycles.com/ca/contact-sl-switch-seatpost> 2019.

Crankbrothers Kronolog Adjustable Seat Post. Online at <https://www.pinkbike.com/news/Crankbrother-Kronolog-Adjustable-Seat-Post.html> 2019.

RASE Components, LLC Launches The Mamba Rapid Adjust Seatpost. Online at https://www.pinkbike.com/news/rase-mamba-rapid-adjust-post-2008.html 2019.

* cited by examiner

BICYCLE SEAT POST TRAVEL ADJUSTMENT ASSEMBLY

CROSS-REFERENCE TO RELATED APPLICATION

The present application claims the benefit under 35 U.S.C. § 119(e) of U.S. provisional patent application No. 62/655,561 filed on Apr. 10, 2018, the entirety of which is hereby incorporated by reference.

FIELD OF THE INVENTION

In one of its aspects, the present disclosure relates to a bicycle seat post assembly, and in particular to a dropper-post type bicycle seat post assembly in which the height of the seat can be adjusted by a user.

INTRODUCTION

Adjustable bicycle seat posts can provide a variety of seat height options to riders. To enable riders to adjust the height of their seat post while riding, so-called "dropper" seat posts have been developed. Dropper seat posts are telescopic posts that allow the rider to change the height of their seat without having to stop and manually adjust the mechanically tightened seat post collar. A typical dropper seat post allows a rider to extend and retract a portion of their seat post while in motion to provide a high and low seat position, respectively.

U.S. Pat. No. 9,688,331 discloses a bicycle seat post assembly includes first and second tubes, which are telescopically arranged, a fluid chamber, which includes a compressible fluid to generate a force to expand the first and second tubes relative to each other, and a positioning structure. The positioning structure includes a support member on one of the first tube and the second tube, a positioning member that pivots about an axis between a first position and a second position, a control unit, which is connected to the positioning member to move the positioning member between the first position and the second position, and a position maintaining member, which is provided on the other of the first tube and the second tube. The position maintaining member includes an engaging portion that engages with the positioning member to maintain a positional relationship between the first and second tubes.

U.S. Pat. No. 8,079,772 discloses an adjustable height seat post for bicycles that comprises an inner tube slidably contained within an outer tube which supports a bicycle seat. The outer tube clamps into a bicycle frame and contains a spring which acts to force the inner tube upward. The inner tube is allowed longitudinal movement within the fixed outer tube via a locking mechanism that forces ball bearings into pockets or channels on the inner tube. The locking mechanism can be remotely activated with a handlebar mounted lever or manually with a seat post mounted lever.

US patent publication no. 2015/0232142 discloses a bicycle seat post assembly comprises a first cylinder, a second cylinder, and a positioning structure. The second cylinder is configured to be telescopically received in the first cylinder. The positioning structure is configured to relatively position the first cylinder and the second cylinder. The positioning structure is configured to switch a state of the bicycle seat post assembly among a first adjustable state and a second adjustable state. In the first adjustable state, a positional relationship between the first cylinder and the second cylinder is continuously adjustable within a first adjustable position range. In the second adjustable state, the positional relationship between the first cylinder and the second cylinder is continuously adjustable within a second adjustable position range different from the first adjustable position range.

SUMMARY

In recent years, "dropper" seat posts have become more desirable. It is advantageous to lower a bicycle seat as far as possible when riding through technical terrain to allow the rider to change their body position or bend their knees deeply without contacting the seat.

Shorter riders are often required to use shorter travel dropper posts because there is less distance between the top of the bicycle frame seat tube and the rails of the bicycle seat when at their preferred seat height. This distance is often known as the dropper seat post "collar-to-rail length".

It is typical for dropper posts to be sold in a variety of non-adjustable travel lengths. For example, a manufacturer may offer stock dropper post models with travel lengths that vary by 20 mm to 25 mm with each model (e.g., 125 mm travel, 150 mm travel, 170 mm travel, etc.). This allows the rider to choose a drop length that correlates to a maximum collar-to-rail length that would be equal to or less than the maximum allowable collar-to-rail length dictated by their height, bicycle frame size, and maximum saddle height requirements. However, if a rider's desired collar-to-rail length falls between two stock travel lengths, the rider may have to opt for the shorter travel length model, thereby sacrificing the maximum available drop of the post.

For example, if a rider is slightly too short to fit a stock 170 mm travel post, they would likely select a stock 150 mm post even if a theoretical 160 mm travel post would be more suitable. As a result, 10 mm of potential collar-to-rail length is sacrificed, thereby reducing the maximum available drop of the post.

There is a general desire to have a dropper post with user adjustable travel so that the post can be tuned to provide the maximum travel length that a given rider needs. For example, if a rider is slightly too short to fit a 170 mm travel post, they may need to select a 150 mm stock travel post even if a theoretical 160 mm travel post would be preferable.

As such, it may be preferable for a manufacturer to offer an increased number of dropper post models with smaller travel length increments (e.g., 125 mm, 130 mm, 135 mm, 140 mm, 145 mm, 150 mm, 160 mm, 165 mm etc.). However, this may not be economically feasible from a manufacturing standpoint.

It may also be desirable to have a means for providing user adjustable travel in a dropper post that can be installed without the need for the dropper post assembly to be fully disassembled and without the need for tools.

Despite the advances made to date in the development of bicycle seat post assemblies, there is room for improvement to address the above-mentioned problems and shortcomings of the prior art.

It may be an object of the present invention to obviate or mitigate at least one of the above-mentioned disadvantages of the prior art, and to provide a novel bicycle seat post assembly.

In accordance with one broad aspect of the teachings described herein a bicycle seat post assembly may include a base assembly that is connectable to a bicycle. The base assembly may include an outer tube having an upper end and a lower end spaced apart from the upper end along an assembly axis and a sidewall having an inner surface and extending axially therebetween. At least a first channel may extend axially in the inner surface of the sidewall. An upper retainer surface may be provided toward the upper end of the outer tube. An extension assembly may include an inner tube having an upper end that is connectable to a bicycle seat, a lower end that is telescopically receivable in the outer tube and a sidewall extending therebetween. The inner tube may have an outer surface facing the inner surface of the outer tube. A first slider may extend radially outwardly from outer surface and may be movable with the inner tube relative to the outer tube. The first slider may be slidably received within the first channel wherein the inner tube may be axially slidable relative to the outer tube between a retracted position in which the first slider is axially spaced apart from the upper retainer surface and a standard extension position in which the first slider contacts the upper retainer surface and the upper end of the inner tube is axially spaced apart from the upper end of the outer tube by a standard extension distance. An extension stopper may be insertable to form part of the base assembly. The extension stopper may include a first leg that extends axially within the first channel from a first base proximate the upper retainer surface to a first tip that overlies at least a portion of the upper retainer surface when the extension stopper is in use. When the inner tube moves from the retracted position toward the standard extension position the extension stopper may remain fixed with the base assembly and the first slider may contact and bear against the first tip thereby limiting axial extension of the inner tube to an intermediary extension position in which the upper end of the inner tube is spaced apart from the upper end of the outer tube by an intermediary extension distance that is less than the standard extension distance.

An interface between the first slider and the base assembly may lie in an engagement plane that is generally orthogonal to the assembly axis. When the inner tube is in the standard extension position the engagement plane may contain the upper retainer surface, and when the inner tube is in the intermediary extension position the interface plane may contain the first tip and may be spaced below the upper retainer surface.

The first tip may be axially spaced from the first base by a stopper length that is equal to the difference between standard extension distance and the intermediary extension distance.

The stopper length may be between about 5 mm and about 40 mm.

The first leg may be frangible whereby a portion of the first leg including the first tip is removable by a user to provide a new first tip to shorten the stopper length.

The outer tube may further include second and third channels extending axial in the inner surface of the side wall and being laterally spaced apart from each other around the inner surface The extension assembly may further include a second slider extending radially outwardly from outer surface and slidably received within the second channel and a third slider extending radially outwardly from outer surface and slidably received within the third channel.

The extension stopper may further include a second leg that extends axially within the second channel from a second base proximate the shoulder portion to a second tip and a third leg that extends axially within the third channel from a third base proximate the shoulder portion to a third tip. When the inner tube is in the intermediary extension position the second slider may contact and bear against the second tip and the third slider may contact and bear against the third tip thereby further resisting axial extension of the inner tube.

The extension stopper may include a shoulder portion disposed adjacent the upper retainer surface and connecting the first, second and third bases.

The extension stopper may be flexible whereby the shoulder portion is bendable to generally conform to a curvature of the inner surface of the outer tube and overlies each of the first, second and third channels.

The extension stopper may be removable such that the upper end of the inner tube is extendible to the extended position.

The extension stopper may be insertable by hand when the inner tube is at least partially received within the outer tube and without the use of a tool.

A bushing may be provided toward the upper end of the outer tube to inhibit tilting of the inner tube relative to the outer tube and may be held in place using a removable collar. A downward facing portion of the bushing may provide the upper retainer surface.

The extension stopper may be positionable relative to the outer tube when the collar and bushing are removed, and the inner tube is in an extension stopper insert position that is axially between the intermediary extension position and the retracted position.

The extension stopper may be made from a different material than the first slider.

The first slider may be harder than the extension stopper.

The first slider may include opposing anti-rotation surfaces that are facing corresponding first channel sidewalls of the first channel, whereby rotation of the inner post about the assembly axis is inhibited by interference between the anti-rotation surfaces and the first channel sidewalls.

Thus, the present inventors have developed a bicycle seat post assembly with a user adjustable travel length. The travel length of the post can be adjusted using an insertable extension stopper, which can modify the travel length of the post by smaller incremental amounts than may be available in standard stock dropper post models. This may allow for riders to better customize the maximum available drop of their seat post to their height, bicycle frame size, and/or saddle height requirements. In addition, the travel length of the present bicycle seat post assembly may be modified without the need to fully disassemble the post assembly and without the need for tools.

The extension stopper further may include a shoulder portion disposed adjacent the upper retainer surface and connected to the first base.

To the knowledge of the inventors, a bicycle seat post assembly with such a combination of features is heretofore unknown.

Other advantages of the invention will become apparent to those of skill in the art upon reviewing the present specification.

BRIEF DESCRIPTION OF THE DRAWINGS

Embodiments of the present invention will be described with reference to the accompanying drawings, wherein like reference numerals denote like parts, and in which.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Bicycle dropper seat posts allow a rider to change the height of their seat while riding without having to stop and adjust a mechanically tightened seat post collar. Dropper seat posts are available in different sizes, having different lengths of travel and different minimum and maximum seat heights. In some circumstances, a rider's desired maximum travel length may fall between two stock travel lengths. In such cases, the rider may have to opt for the shorter travel length model, thereby sacrificing the maximum available drop of the post. Providing a seat post assembly in which a rider can modify the travel length of a dropper seat post may assist a rider in maximizing the available travel or "drop" of their seat post.

Referring to FIGS. 1-6, one example of a bicycle seat post assembly 100 is shown. The seat post assembly 100 has a base assembly 101 that is intended to be connected to a bicycle (not shown) and an extension assembly 102 that is connectable to a bicycle seat (not shown) and is movable relative to the base assembly 101 so that the height of the bicycle seat can be adjusted.

The base assembly 101 is preferably connectable to the bicycle and is intended to remain generally fixed relative to the rest of the bicycle frame. For example, the base assembly 101 may be fastened within a seat post of a bicycle. In this example, the base assembly 101 includes an outer tube 120 and may also include a removable top cap or collar 130, an upper bushing 112 to help support pieces of the extension assembly 102, a locking air spring (details not shown for clarity) that can drive the extension assembly, an actuator 140 for triggering the air spring as well as any other desired seals and the like. While one exemplary embodiment of a base assembly 102 is shown, other configurations are possible.

In this example, the outer tube 120 extends axially along an assembly axis 111 between an upper end 181 and a lower end 122 and has a sidewall extending therebetween. Preferably, the outer tube 120 has one or more axial channels 121 extending along its inner surface 183. The channels 121 may extend from about the lower end 122 of the outer tube 120 to about the upper end of 181 of the outer tube 120. In the illustrated example, the lower tube 120 has three axial channels 121a, 121b, 121c; however, the number of channels will vary with the number of sliders, as discussed below.

The extension assembly 102 is configured to engage with, and be movable/adjustable relative to the base assembly 101. In the illustrated example, the extension assembly has an inner tube 110 that extends axially (i.e. in a direction parallel to axis 111) between an upper end 180 and a lower end 115. The upper end 180 is configured to receive a seat attaching assembly, such as the seat clamping apparatus 182. A bicycle seat (not shown) can be attached to the seat clamping apparatus 182 such that it can move up and down with the inner tube 110 when the assembly 100 is in use.

Figure 1:
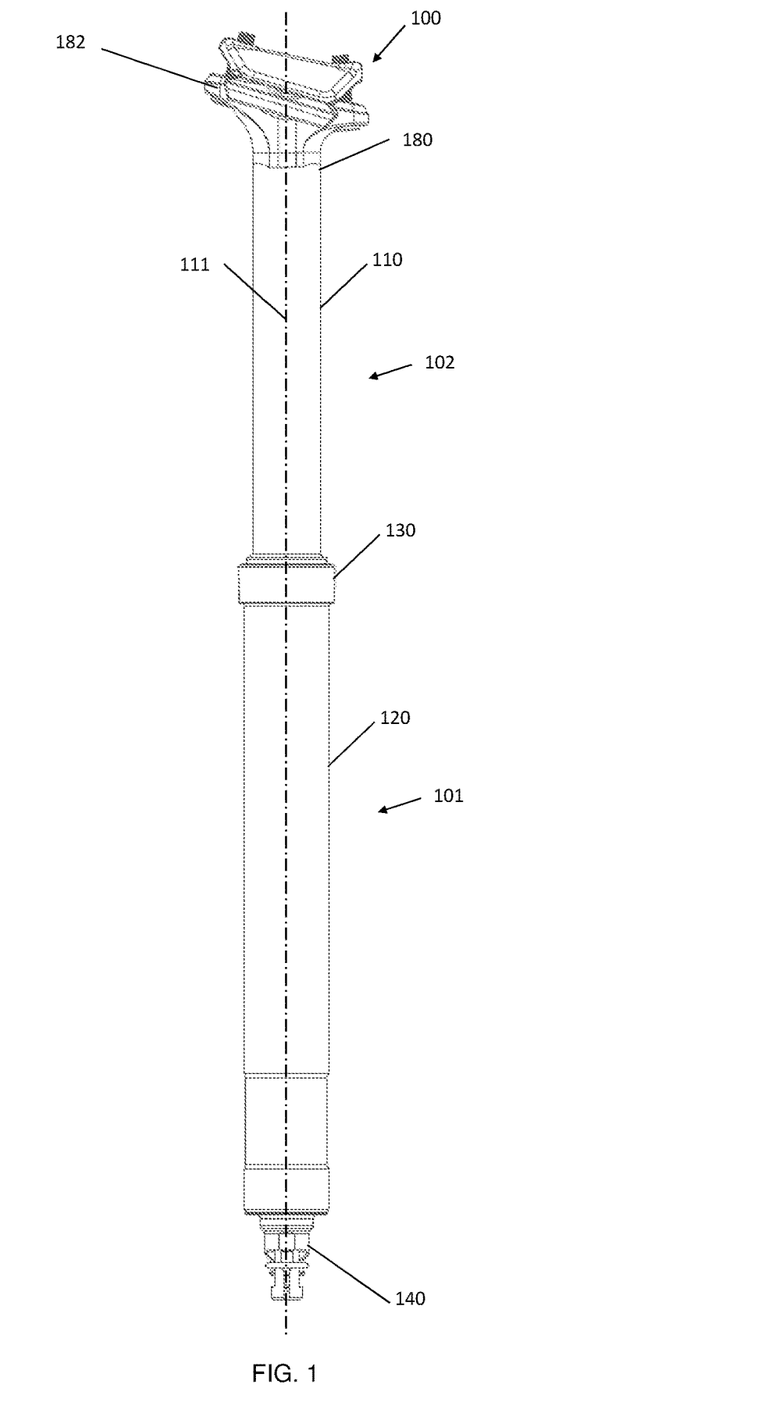
FIG. 1 is a side view of one example of a seat post assembly, wherein the inner tube of the seat post assembly is in the extended position.
Figure 2:
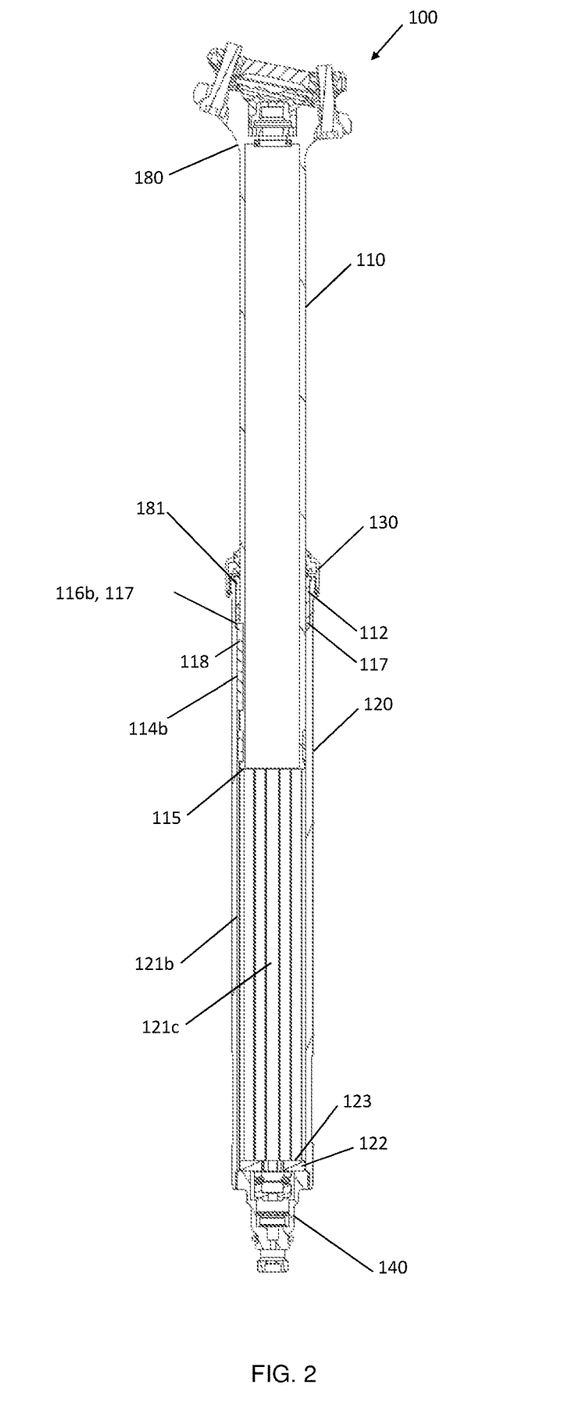
FIG. 2 is a side cross-sectional view of the seat post assembly of FIG. 1.
Figure 3:
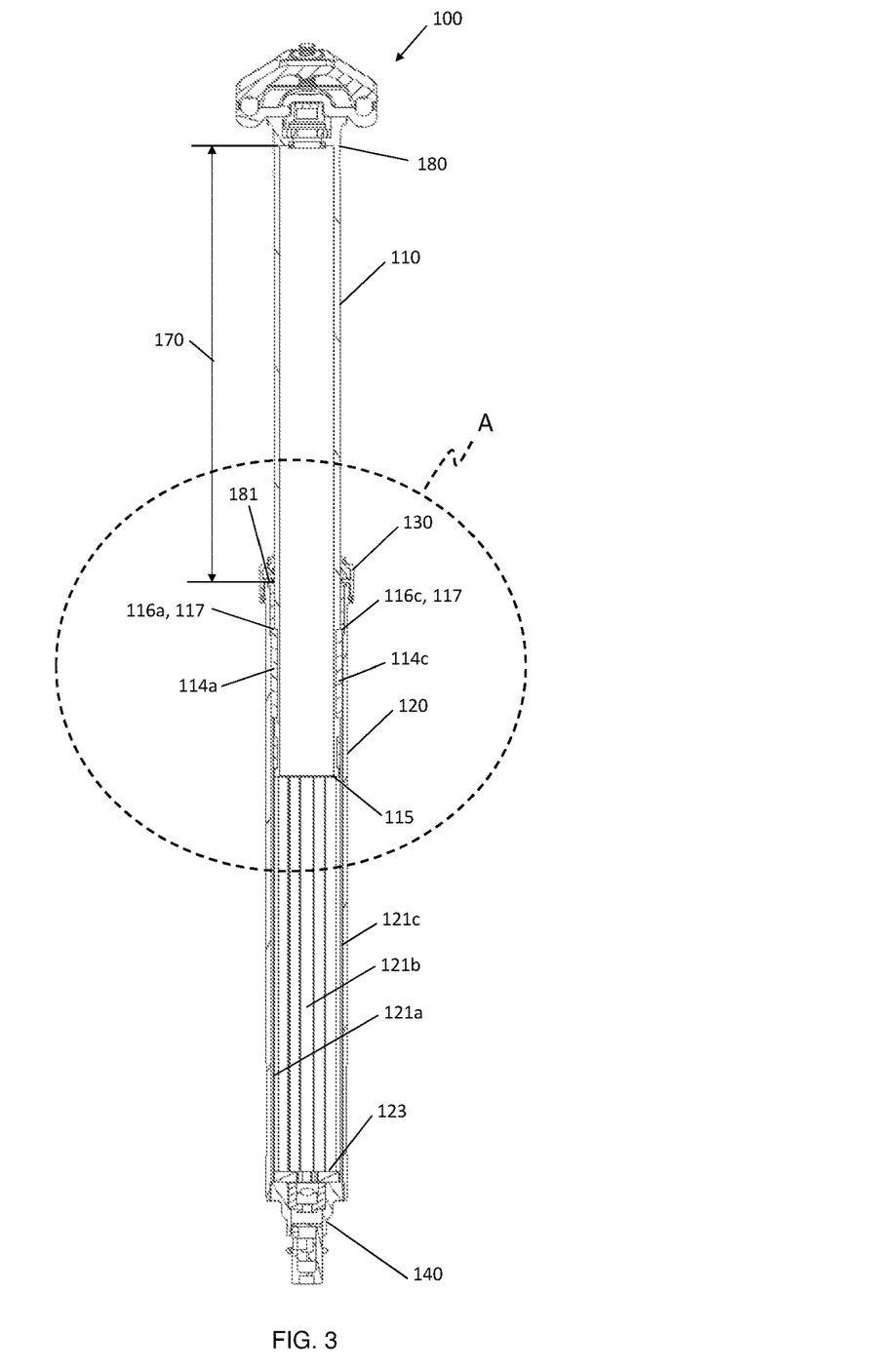
FIG. 3 is front cross-sectional view of the seat post assembly of FIG. 1.
Figure 5:
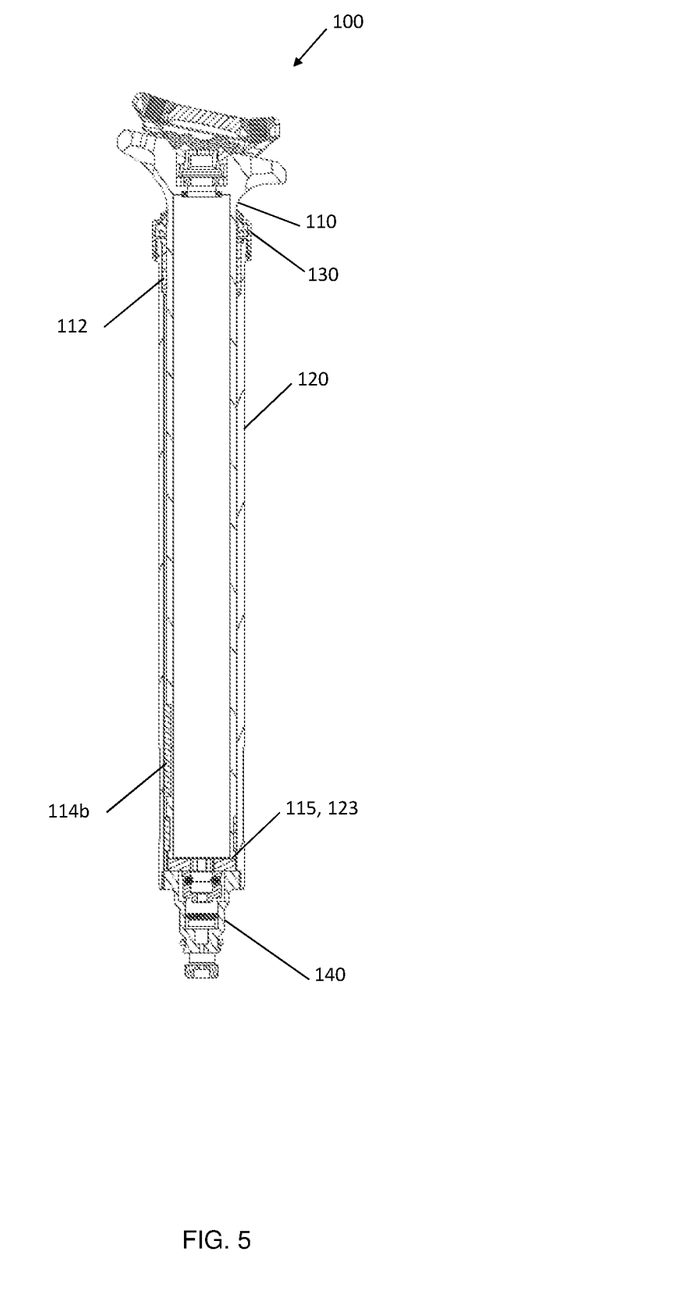
FIG. 5 is a side cross-sectional view of the seat post assembly of FIG. 1, wherein the inner tube of the seat post assembly is in the retracted position.
Figure 6:
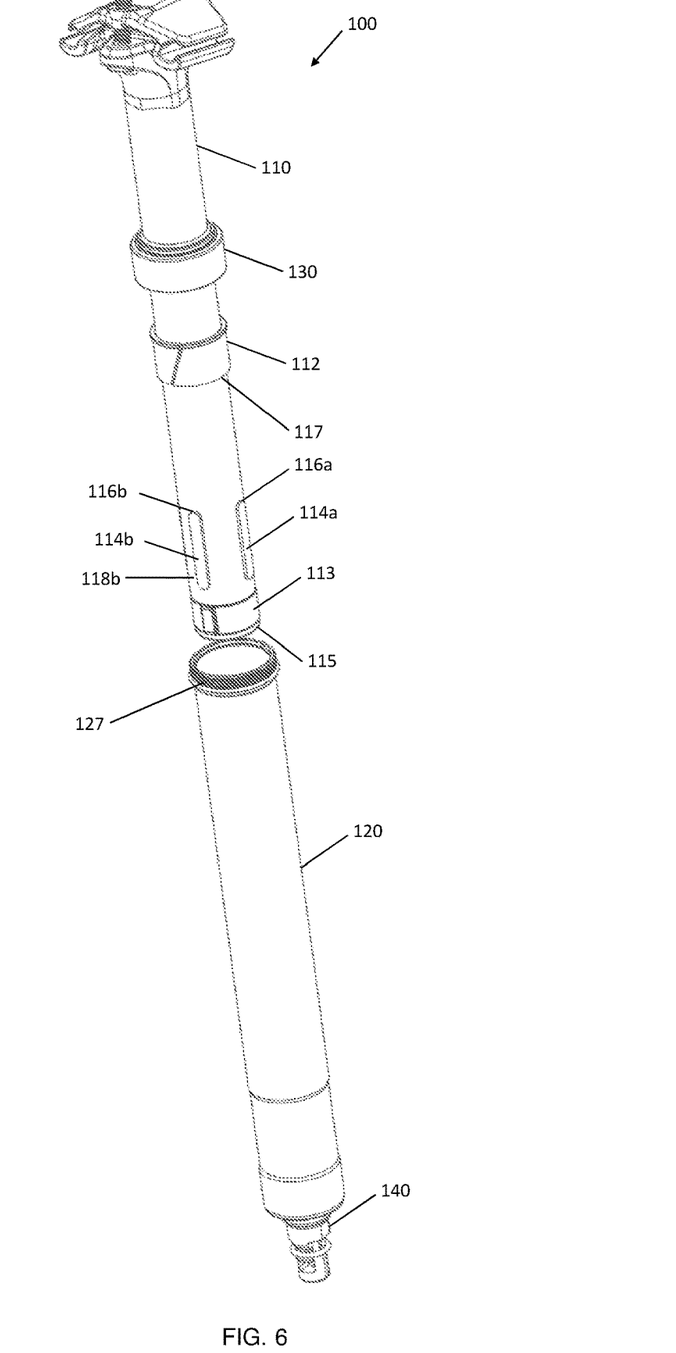
FIG. 6 is a partially exploded perspective view of the seat post assembly of FIG. 1.
Figure 7:
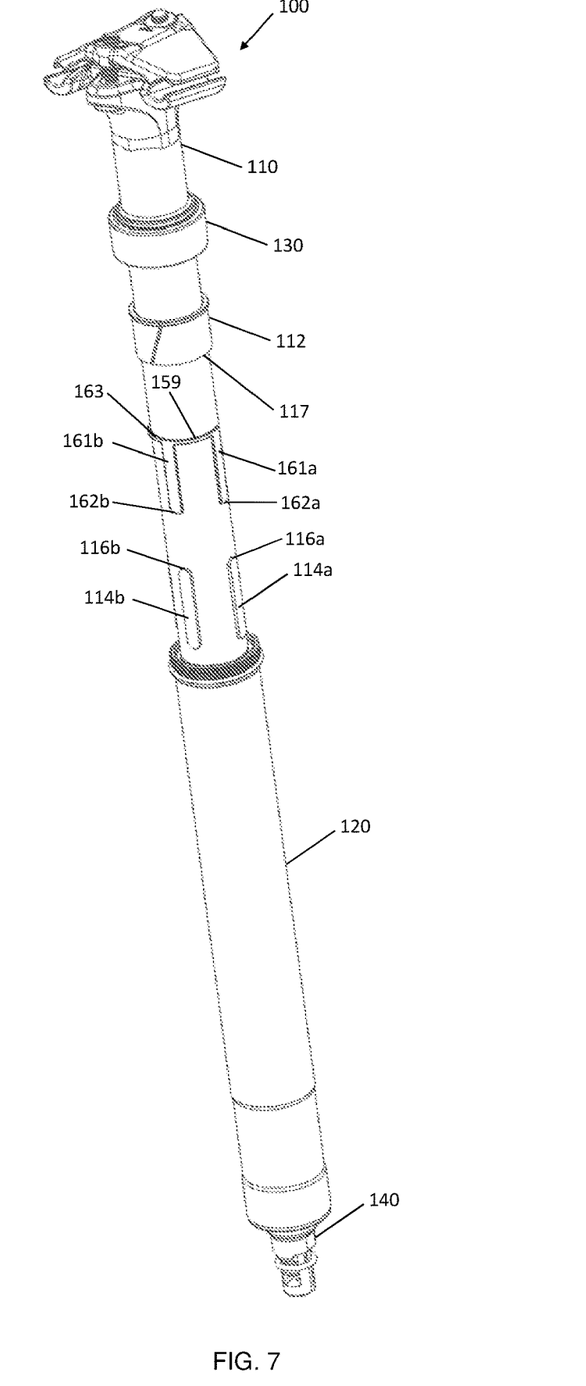
FIG. 7 is a partially exploded perspective view of the seat post assembly of FIG. 1, wherein an extension stopper has been inserted.
Figure 8:
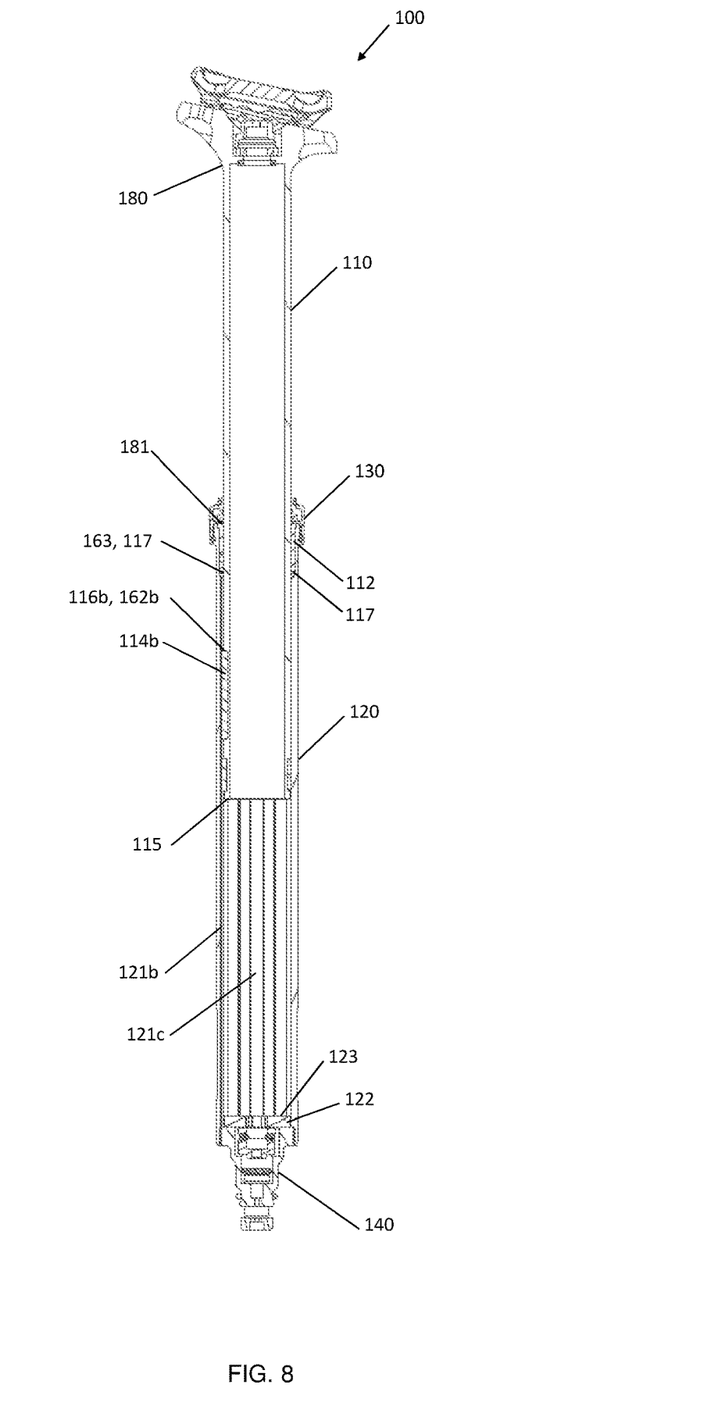
FIG. 8 is a side cross-sectional view of the seat post assembly of FIG. 7.
Figure 9:
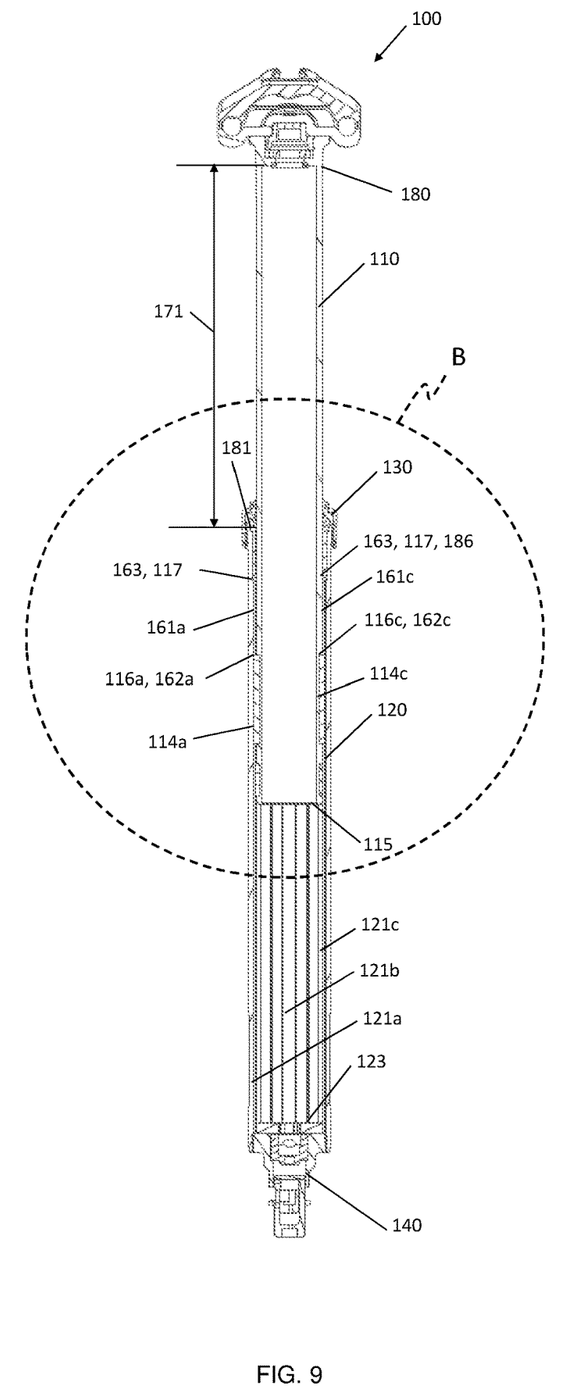
FIG. 9 is front cross-sectional view of the seat post assembly of FIG. 7.

The upper end 181 of the outer tube 120 is open to receive the inner tube 110. The outer tube 120 is preferably configured to telescopically receive at least a portion of the lower end 115 of the inner tube 110, such that the inner tube 110 is axially slidable relative to the outer tube 120 between an extended position (as illustrated in FIGS. 1-3) and a retracted position (as illustrated in FIG. 5). The degree of overlap between the inner tube 110 and the outer tube 120 when the inner tube 110 is extended can be selected so that the assembly 100 can provide a desired degree of resistance to tilting of the inner tube 110. The upper bushing 112 is fixed to the base portion 102 and a lower bushing 113 is provided toward the lower end 115 of the inner tube 110 and moves with the inner tube 110. The bushings 112 and 113 help resist tilting of the inner tube 110 relative to the outer tube 120 while permitting the desired axial translation/sliding.

The lower end 122 of the outer tube 120 may comprise a bumper, configured to help cushion the lower end 115 of the inner tube 110 when the inner tube 110 is in the retracted position. The lower end 122 of the outer tube 120 has an upper surface 123. When in the retracted position, the lower end 115 of the inner tube is adjacent to or abuts the upper surface 123.

While the bushings 112 and 113 may help constrain tilting of the inner tube 110, the assembly 100 may include a separate anti-rotation mechanism that can help resist and/or limit rotation of the inner tube 110 about the axis 111. This may be of any suitable configuration, including a keyed arrangement, in which anti-rotation extending from one of the inner tube 110 and outer tube 120 may be disposed within, and slide along corresponding channels or tracks on the other of the inner tube 110 and outer tube 120.

Figure 4:
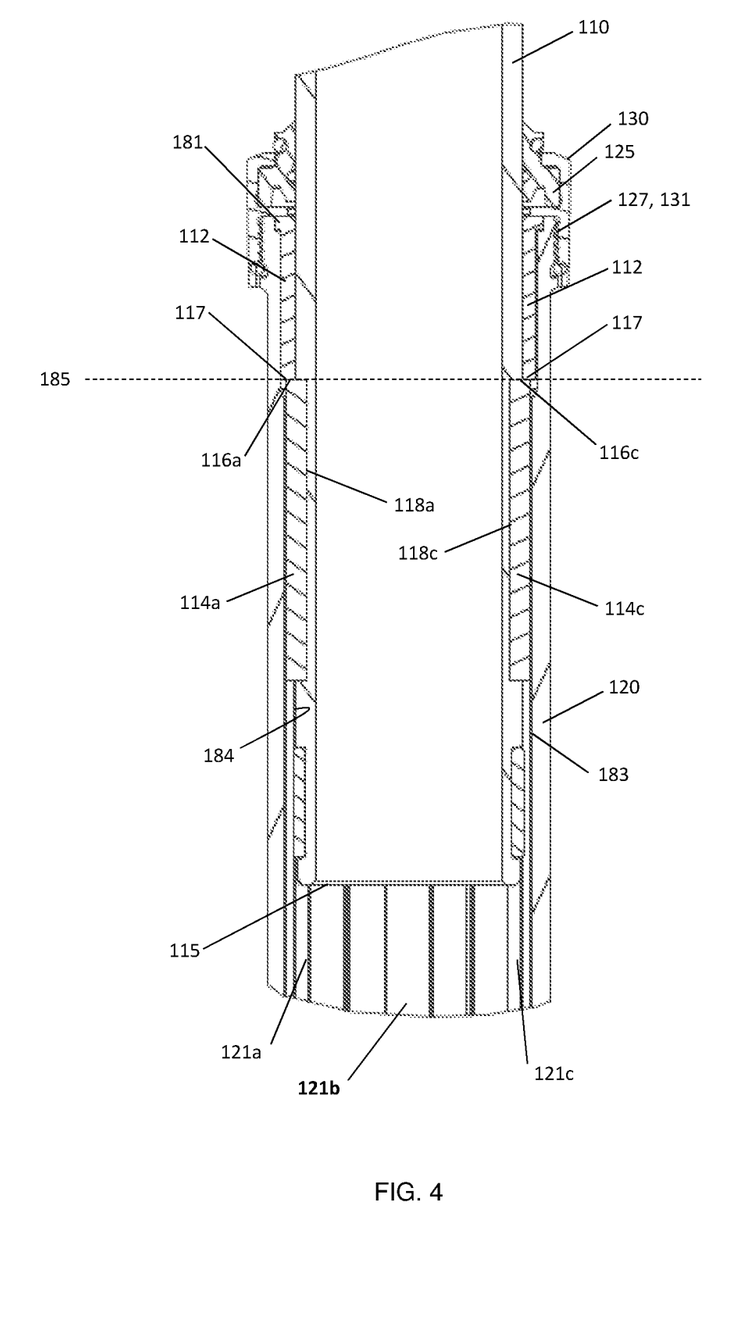
FIG. 4 is a magnification of section A of FIG. 3.

In the illustrated example, the inner tube 110 may have one or more axially extending grooves 118 (FIG. 6) that are formed in its outer surface 184 (FIG. 4). Preferably, the grooves 118 are not through holes, and do not provide access to the interior of the inner tube 110. The grooves 118 can be sized to at least partially, radially receive respective sliders 114 or other type of anti-rotation member that can then extend radially outwardly from the groove 118 and beyond an outer surface of the inner tube 110. The slider 114 positioned in the groove 118 can be axially slidably received in a corresponding member on the inner surface of the outer tube 120, and in this example each slider 114 is received within a corresponding one of the channels 121. The channels 121 and sliders 114 can be configured to permit axial movement between the inner and outer tubers 110, 120 while interference between the opposing anti-rotation surfaces on the opposing sides of the sliders 114 and radially extending sidewalls of the channels 121 will inhibit rotation between the inner and outer tubes 110 and 120 about the assembly axis 111.

While a single groove 118 with slider 114, and channel 121 may be sufficient to limit rotation of the inner tube 110 in some embodiments, it may be preferable to include two or more sets of grooves 118, pins 114 and channels 121 to help provide further rotational resistance. In the illustrated embodiment, the inner tube 110 has three grooves 118a, 118b, 118c circumferentially spaced apart from each other around its perimeter (generally equally spaced in this example). In other embodiments, there may be one, two, or more than three grooves. Each groove 118.

To help control the axial extension of the inner tube 110, the assembly 100 may include any suitable positioning apparatus that can limit the axial extension of the inner tube 110 relative to the outer tube 120 at a desired position. In the illustrated example, the inner tube 110 can move between its retracted position (FIG. 5) in which the bicycle seat would be at its lowest position and a standard extension position (FIG. 3) in which the bicycle seat would be at its highest position/elevation for the configuration a given assembly 100. When in its standard extension position, the upper end 180 of the inner tube 110 is axially spaced apart from the upper end 181 of the outer tube 120 by a standard extension distance 170, which is generally a pre-determined distance set by the manufacturer of the assembly 100.

To help limit the axial movement of the inner tube 110 at its standard extension position, the base assembly 102 includes, in this example, an upper retainer surface 117 that is positioned and configured to engage a portion of the extension assembly 101 when the inner tube 110 has reached its standard extension position and to limit further axial movement. In the illustrated example, the extension assembly 101 is configured such that it is the sliders 114, and more specifically the upper surfaces 116a-c of the sliders 114a-c, that contact and bear against the upper retainer surface 112 to limit the movement of the inner tube 110 when the inner tube 110 has reached its standard extension position and to limit further axial movement. That is, in addition to helping inhibit rotation of the inner tube 110, the sliders 114 and also be utilized to limit the axial extension of the inner tube 110. When the inner tube 110 is retracted, then the sliders 114a-c are axially spaced apart from the upper retainer surface 117.

In the illustrated example, a downward facing lower surface of the bushing 112 provides the upper retainer surface 117. This may help reduce the number of parts required to form the base assembly 102, as compared to using a bushing and a separate member to provide the retainer surface. Alternatively, the upper retaining surface 117 need not be part of the bushing 112 but may be provided on any suitable part of the base assembly 102, including being formed as part of the outer tube 120, collar 130 and other suitable members.

In this example, the collar 130 acts as a top cap on the upper end 181 of the outer tube 120 and has threads 131 that are configured to engage with threads 127 on the upper end 181 of the outer tube 120. Unthreading the collar 130 can allow a user to access the interior of the assembly 100 for maintenance, inspection, and/or for the insertion or removal of one or more extension stoppers as described in more detail herein. The collar 130 can also contain and support other functional components of the assembly 100, such as the bushing 112.

Preferably, the seat post travel length of the assembly 100 can be reduced through the use of one or more insertable extension stoppers 160. This allows a user to modify the configuration of the assembly 100 based on his/her particular preferences and in particular to vary the amount of axial extension of the inner tube 110. This may allow a user to set a more desirable, intermediary extension position in which the upper end 180 of the inner tube 110 is spaced apart from the upper end 181 of the outer tube 120 by an intermediary extension distance that is less than the standard extension distance 170. Preferably, the insertion of the extension stopper 160 can be done by a user, and more preferably without the need for tools and/or for substantially disassembling the assembly 100. That is, by inserting an extension stopper 160 into the bicycle seat post assembly 100, the axial extension, or travel length, of the inner tube 110 can be customized by the user.

FIGS. 7-10 illustrate the bicycle seat post assembly with the addition of one example of an extension stopper 160. This example will be described in detail, but other configurations are possible. FIGS. 11-16 show the extension stopper 160 in isolation.

In the illustrated example, extension stopper 160 is configured so that when inserted in a "use" position, it forms part of the generally stationary base assembly 102 and is positioned axially between the slider 114 and the upper retainer surface 117. In this position, when the inner tube 110 moves from its retracted position toward the standard extension position the extension stopper remains generally fixed with the base assembly 102 and portions of the extension stopper 160 form new or proxy contact surfaces to engage the extension assembly 101. That is, in this example the first slider 114 would contact portions of the extension stopper 160 (e.g. the tips 162a-c described below) before reaching the original upper retainer surface 117, thereby limiting axial extension of the inner tube 110 to an intermediary extension position in which the upper end 180 of the inner tube 110 is spaced apart from the upper end 181 of the outer tube 120 by an intermediary extension distance 171 (FIG. 9) that is less than the standard extension distance 170 (FIG. 3).

In other words, to limit the axial extension of the inner tube 110 the extension stopper 160 is configured so that when the inner tube 110 moves from the retracted position towards the extended position, the extension stopper 160 is engaged by and maintains an axial gap between the slider 114 and the upper retainer surface 117, thereby limiting the axial extension of the inner tube 110. The intermediary extension distance 171 is the seat post travel length of the intermediate position of the seat post assembly and is less than the standard extension distance 170 of the seat post (i.e., with no extension stopper inserted and the seat post assembly in the extended position).

Referring to FIGS. 11 to 16, in the illustrated example, extension stopper 160 includes an upper connection, shoulder portion 159 that has an upper surface 163 (when viewed as illustrated in FIGS. 11-16) and three legs 161a, 161b, 261c depending therefrom. Each leg 161 extends from a respective base 167a-c that is adjacent the shoulder portion 159 to respective tips 162a, 162b and 262c, respectively. While this example is shown having three legs 161a-c, in other embodiments, extension stopper 160 may have only one, two, or more than three legs. Generally, the number of legs may depend on the number of channels 121 that the outer tube 120 has and/or the number sliders 114 used in a given example of the assembly 100. Alternatively, in other embodiments the extension stopper 160 need not include a connecting shoulder portion 159. In such embodiments, the legs 161a-c may be separate pieces that can be inserted and/or removed independently of each other.

A distance between the upper surface 163 and the tips 162a-c of the legs 161a-c can define an extension stopper length 164. When the extension stopper 160 is in use, the upper surface 163 may overlie and bear against the upper retainer surface 117 and the tips 162a-c may overlie portions of the upper retainer surface 117 and the contact respective ones of the sliders 114. In this arrangement, the difference between the intermediary extension distance 171 and the standard extension distance 170 is substantially equal to the extension stopper length 164. Therefore, modifying the extension stopper length 164 may modify the intermediary extension distance 171. In some examples, the extension stopper length 164 may be between about 5 mm and about 40 mm and may preferably be between about 10 mm and 20 mm.

In some embodiments, a user may be able to further customize the travel distance of the inner tube 110 by removing a frangible portion of each leg 161a-c prior to inserting the extension stopper 160. For example, the legs 161a-c may be frangible so that they can be cut by a user along a desired cut line 169 (FIG. 12, for example using scissors) such that a lower portion 171 of the leg 161a, including the original tip 162a, could be removed. The location of the cut line 169 would then form the new tip of the leg 162a, and the extension stopper length would be reduced from original length 164 to shortened length 164'. For example, if a 164 mm travel post is desired, a user could select a 170 mm stock travel post and insert an extension stopper 160 that originally had an extension stopper length 164 of 10 mm but in which 4 mm had been cut from of each leg 161a-c. This would provide an intermediate position with a travel length of 164 mm.

Preferably, the extension stopper 160 is made of a material that is flexible enough to allow at least the shoulder portion 159 to be bendable and to generally conform to a curvature of the inner surface 183 of the outer tube 120 and/or the outer surface 184 of the inner tube 110 and overlies each of the first, second and third channels 121a-c. This may help facilitate positioning of the legs 161a-c into their respective channels 121a-c, while the shoulder portion 159 helps hold the legs 161a-c in their desired relative positions and may help prevent the legs 161a-c from falling into the channels 121a-c or otherwise moving out of a desired position when the extension stopper 160 is in use. For example, extension stopper 160 may be made of plastic.

Optionally, the extension stopper 160 may be made from a material that is softer and/or less durable than the sliders 114. Over time, when the extension stopper 160 is in use, configuring the sliders 114 to be harder than the extension stopper 160 may help reduce wear and/or damage to the sliders 114 when the assembly 100 is in use, as the extension stopper 160 may tend to wear first. This may help preserve the integrity of the sliders 114 and extension assembly 101, and an extension stopper 160 may be replaced with a new extension stopper 160 if it becomes worn.

In the illustrated example, extension stopper 160 can be inserted by a user without the need to fully disassemble the seat post assembly 100 and without the need for tools (i.e., the extension stopper can be inserted by hand). To insert the extension stopper 160, the collar 130 is unthreaded from the outer tube 120 and slid upwards along the inner tube 110. With the collar 130 removed, the bushing 112 can also be lifted out of the upper end of the outer tube 120. The inner tube 110 can then be partially retracted to an extension stopper insert position that is axially between the intermediary extension position and the retracted position. This can move the upper surfaces 116a-c of the sliders 114a-c away from the position of the original upper retainer surface 117 by a distance that is equal to or greater than the stopper height 164, thereby creating sufficient room within each channel 121a-c to receive the respective legs 161a-c of the extension stopper 160.

The extension stopper 160 can then be bent into the desired, curved shape and the inserted into outer tube 120, by sliding legs 161a, 161b, and 161c into corresponding channels 121a, 121b, and 121c. The upper bushing 112 can then be re-inserted, thereby engaging the shoulder portion 159 with the upper retainer surface 117 and holding the extension stopper 160 in place. The collar 130, and any other parts, can then be replaced such that the seat post assembly 100 is re-assembled and operable again.

Figure 10:
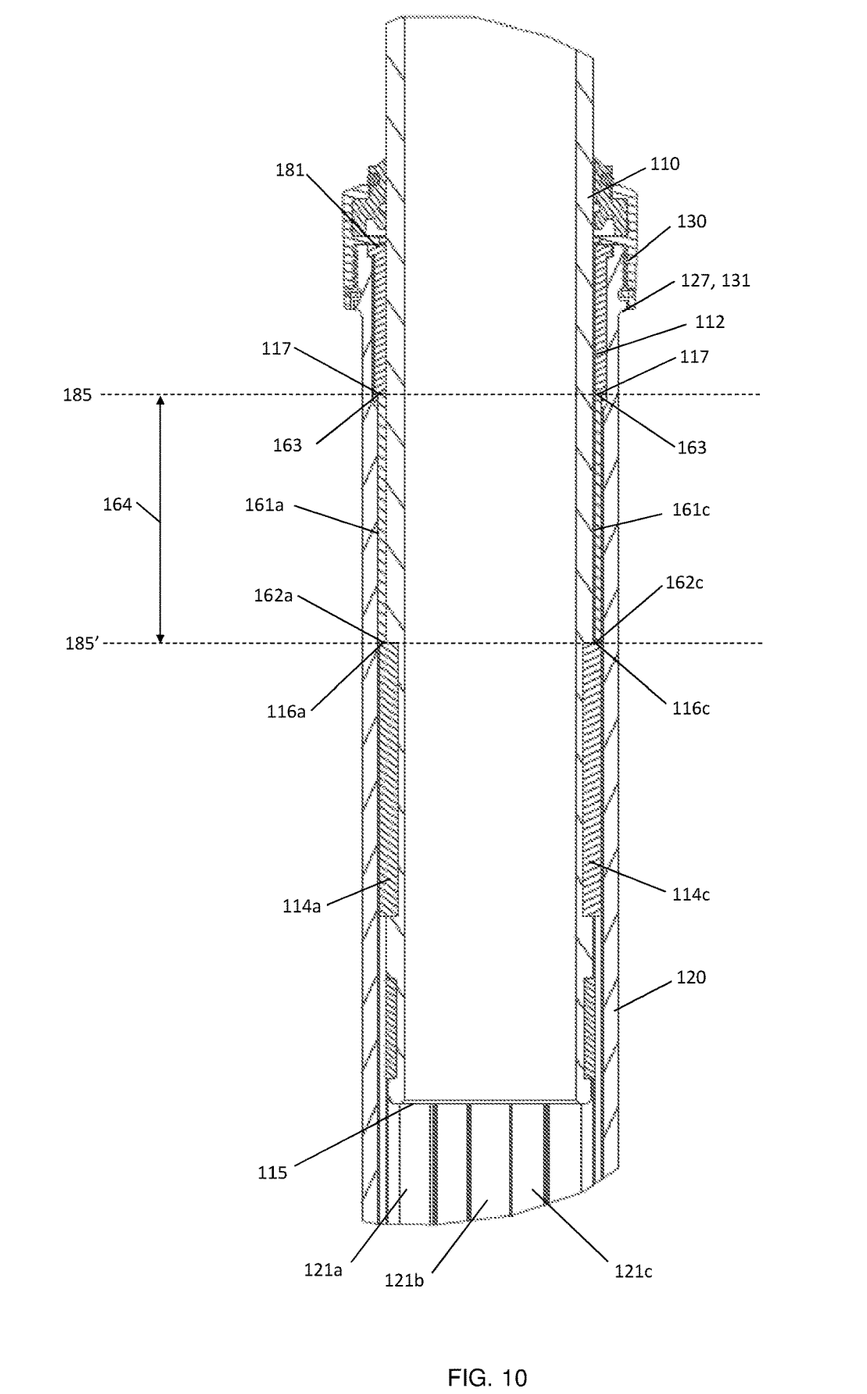
FIG. 10 is a magnification of section B of FIG. 9.
Figure 11:
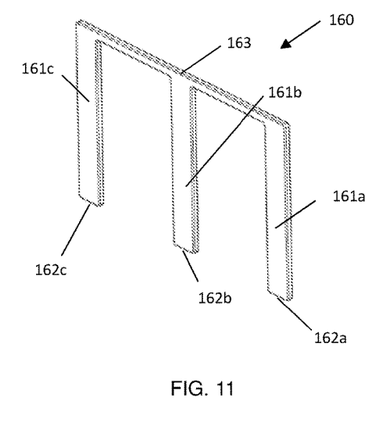
FIG. 11 is a front perspective view of one example of an extension stopper.
Figure 12:
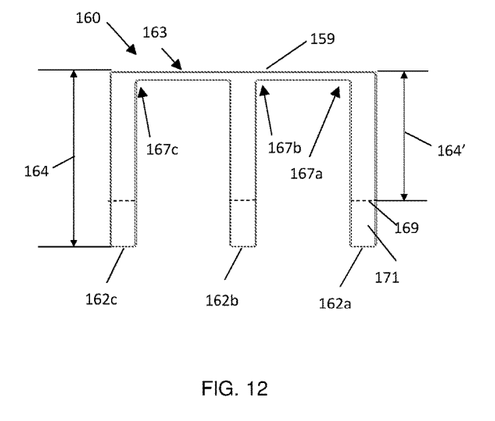
FIG. 12 is a front view of the extension stopper of FIG. 11.
Figure 13:
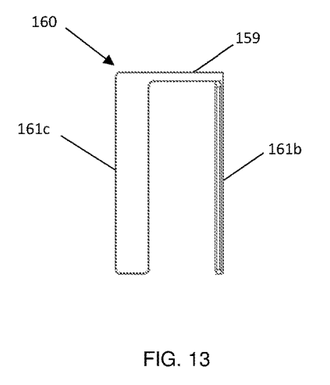
FIG. 13 is a side view of the extension stopper of FIG. 11, wherein the extension stopper is in a curved form.
Figure 14:
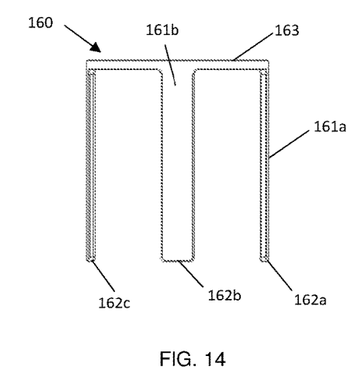
FIG. 14 is a front view of the extension stopper of FIG. 13.
Figure 15:
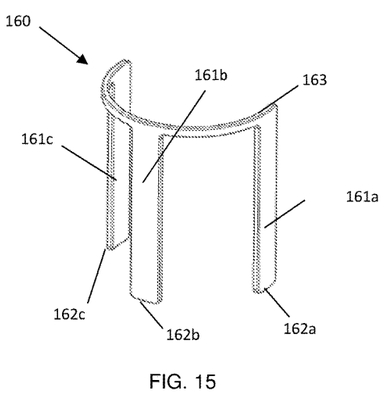
FIG. 15 is a front perspective view of the extension stopper of FIG. 13.
Figure 16:
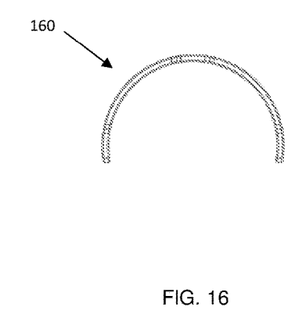
FIG. 16 a top view of the extension stopper of FIG. 13.

FIG. 10 is a cross-sectional view showing the location of the extension stopper 160 when assembled in this manner, with the legs 161a-c being axially between the upper retainer surface 117 and the upper surfaces 116a-c of the sliders 114a-c when the inner tube 110 is extended to its new, intermediary extension position. When the inner tube 110 in this example is subsequently retracted, the sliders 114a-c will move downwardly away from the tips 162a-c of the legs 161a-c (as illustrated in FIG. 10), while the shoulder portion 159 helps hold the legs 161a-c in a generally stationary position.

In the illustrated example, extension stopper 160 is positioned so that when the inner tube 110 moves from the retracted position to the extended position, the tip 162 of each leg 161 of extension stopper 160 is engaged by the upper surface 116 of the corresponding slider 114. The upper surface 163 of extension stopper 160, in turn, contacts the lower surface 117 of the outer tube 120, thereby maintaining an axial gap between the slider 114 and the outer contact member 112. This limits the axial extension of the inner tube 110 to an intermediate position that is between the retracted position and the extended position.

In the intermediate position, the lower end 115 of the inner tube 110 is axially spaced apart from the upper surface 123 of the outer tube 120 by a second distance 171. The second distance 171 is less than the first distance 170 of the seat post (i.e., the travel distance of the inner tube 110 with no extension stopper in place, when the inner tube 110 moves from the retracted position to the extended position) by an amount equal to the extension stopper length 164. In other words, the second distance 171 is equal to the first distance 172 minus the extension stopper length 164. If the extension stopper 160 is removed from the seat post assembly, the inner tube 110 is extendible to the extended position.

In the illustrated example, if the extension stopper 160 is removed from the seat post assembly, the inner tube 110 is once again extendible to its standard extended position.

Referring to FIG. 4, in the illustrated example, the interface between the moving pieces of the extension assembly 101 and the base assembly 102 (i.e. the points of contact between the upper surfaces 116a-c of the sliders 114a-c and the upper retaining surface 117) lies in an engagement plane 185 that is generally orthogonal to the assembly axis 111. When the inner tube 110 is in the standard extension position (FIG. 3) the engagement plane 185 contains the upper retainer surface 117 and upper surfaces 116a-c.

Optionally, by utilizing the extension stopper 160 described herein, the assembly 100 can be modified such that the location of the engagement plane (i.e. the location of the contact between the moving extension assembly 101 and fixed base assembly 102) moves downwardly, away from the upper end 181 of the outer tube 120, so that when the inner tube 110 is in its intermediary extension position the interface plane 185, with new position shown using character 185' in FIG. 10 and contains the tips 162a-c of the legs 161a-c and is spaced below the upper retainer surface 117. In this arrangement the engagement plane 185 shifts downwardly by the stopper length 164, essentially lowering the position of the contact surface on the base assembly 102 (e.g. either the upper retainer surface 117 or tips 162a-c in the present example).

Preferably, the bicycle seat post assembly 100 includes a control assembly to urge the inner tube 110 from the retracted position toward the extended position. The control mechanism may include an actuator 140. When the actuator 140 is actuated, the inner tube 110 moves from the retracted position to the extended position. By actuating the actuator 140, the locking air spring (not shown) is unlocked, allowing the inner tube 110 to slide freely along axis 111 (FIG. 1). The slider 114 (114a, 114b, 114c, as illustrated) slides in groove 121 (121a, 121b, 121c, as illustrated) to eliminate relative rotation between inner tube 110 and outer tube 120. The inner tube 110 is in the extended position (i.e., the upper limit of the travel length of the post assembly; FIGS. 1-3) when the upper surface 116 of the slider 114 contacts the lower surface 117 of the bushing 112.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent, or patent application was specifically and individually indicated to be incorporated by reference in its entirety.

What is claimed is:

1. A bicycle seat post assembly comprising:
   a) a base assembly connectable to a bicycle and comprising:
      i. an outer tube having an upper end and a lower end spaced apart from the upper end along an assembly axis and a sidewall having an inner surface and extending axially therebetween, wherein at least a first channel extends axially in the inner surface of the sidewall and
      ii. an upper retainer surface provided toward the upper end of the outer tube;
   b) an extension assembly comprising:
      i. an inner tube having an upper end that is connectable to a bicycle seat, a lower end that is telescopically receivable in the outer tube and a sidewall extending there between and having an outer surface facing the inner surface of the outer tube;
      ii. a first slider extending radially outwardly from the outer surface and movable with the inner tube relative to the outer tube, the first slider is slidably received within the first channel wherein the inner tube is axially slidable relative to the outer tube between a retracted position in which the first slider is axially spaced apart from the upper retainer surface and a standard extension position in which the first slider contacts the upper retainer surface and the upper end of the inner tube is axially spaced apart from the upper end of the outer tube by a standard extension distance; and
   c) an extension stopper that is insertable to form part of the base assembly, the extension stopper comprises a first leg that extends axially within the first channel from a first base proximate the upper retainer surface to a first tip that overlies at least a portion of the upper retainer surface when the extension stopper is in use, so that when the inner tube moves from the retracted position toward the standard extension position the extension stopper remains fixed with the base assembly, the first slider contacts the first tip thereby limiting axial extension of the inner tube to an intermediary extension position in which the upper end of the inner tube is spaced apart from the upper end of the outer tube by an intermediary extension distance that is less than the standard extension distance.

2. The bicycle seat post assembly of claim 1, wherein an interface between the first slider and the base assembly lies in an engagement plane that is generally orthogonal to the assembly axis, and wherein when the inner tube is in the standard extension position the engagement plane contains the upper retainer surface, and when the inner tube is in the intermediary extension position the engagement plane contains the first tip and is spaced below the upper retainer surface.

3. The bicycle seat post assembly of claim 1, wherein the first tip is axially spaced from the first base by a stopper length that is equal to the difference between standard extension distance and the intermediary extension distance.

4. The bicycle seat post assembly of claim 3, wherein the stopper length is between about 5 mm and about 40 mm.

5. The bicycle seat post assembly of claim 4, wherein the first leg is frangible whereby a portion of the first leg including the first tip is removable by a user to provide a new first tip to shorten the stopper length.

6. The bicycle seat post assembly of claim 1, wherein
   a) the outer tube further comprises second and third channels extending axially in the inner surface of the side wall and being laterally spaced apart from each other around the inner surface;
   b) the extension assembly comprises a second slider extending radially outwardly from the outer surface and slidably received within the second channel and a third slider extending radially outwardly from the outer surface and slidably received within the third channel; and
   c) the extension stopper further comprises a second leg that extends axially within the second channel from a second base proximate the upper retainer surface to a second tip and a third leg that extends axially within the third channel from a third base proximate the upper retainer surface to a third tip, whereby when the inner tube is in the intermediary extension position the second slider contacts the second tip and the third slider contacts the third tip thereby further resisting axial extension of the inner tube.

7. The bicycle seat post assembly of claim 6, wherein the extension stopper comprises a shoulder portion disposed adjacent the upper retainer surface and connecting the first, second and third bases.

8. The bicycle seat post assembly of claim 7, wherein the extension stopper is flexible whereby the shoulder portion is bendable to generally conform to a curvature of the inner surface of the outer tube and overlies each of the first, second and third channels.

9. The bicycle seat post assembly of claim 1, wherein the extension stopper is removable such that the upper end of the inner tube is extendible to the extended position.

10. The bicycle seat post assembly of claim 1, wherein the extension stopper is insertable by hand when the inner tube is at least partially received within the outer tube and without the use of a tool.

11. The bicycle seat post assembly of claim 1, further comprising a bushing provided toward the upper end of the outer tube to inhibit tilting of the inner tube relative to the outer tube and held in place using a removable collar, and wherein a downward facing portion of the bushing comprises the upper retainer surface.

12. The bicycle seat post assembly of claim 11, wherein the extension stopper is positionable relative to the outer tube when the collar and bushing are removed and the inner tube is in an extension stopper insert position that is axially between the intermediary extension position and the retracted position.

13. The bicycle seat post assembly of claim 1, wherein the extension stopper is made from a different material than the first slider.

14. The bicycle seat post assembly of claim 13, wherein the first slider is harder than the extension stopper.

15. The bicycle seat post assembly of claim 1, wherein the first slider comprises opposing anti-rotation surfaces that are facing corresponding first channel sidewalls of the first channel, whereby rotation of the inner post about the assembly axis is inhibited by interference between the anti-rotation surfaces and the first channel sidewalls.

16. The bicycle seat assembly of claim 1, wherein the extension stopper further comprises a shoulder portion disposed adjacent the upper retainer surface and connected to the first base.

* * * * *